(12) United States Patent
Engdahl et al.

(10) Patent No.: US 9,310,922 B2
(45) Date of Patent: Apr. 12, 2016

(54) METHOD AND APPARATUS FOR DETERMINING A SELECTION OPTION

(75) Inventors: Gustav Engdahl, Malmö (SE); Glenn Eric Kennard, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 198 days.

(21) Appl. No.: 13/460,258

(22) Filed: Apr. 30, 2012

(65) Prior Publication Data

US 2013/0285931 A1 Oct. 31, 2013

(51) Int. Cl.
G06F 3/0488 (2013.01)
G06F 3/041 (2006.01)

(52) U.S. Cl.
CPC ............ G06F 3/0416 (2013.01); G06F 3/0488 (2013.01)

(58) Field of Classification Search
CPC ........... G06F 3/01; G06F 3/033; G06F 3/048; G06F 3/0481; G06F 3/04812; G06F 3/04817; G06F 3/04842; G06F 3/0482; G06F 3/0488
See application file for complete search history.

(56) References Cited

U.S. PATENT DOCUMENTS

| | | | |
|---|---|---|---|
| 7,911,481 B1 * | 3/2011 | Ballagh et al. | 345/629 |
| 8,407,606 B1 * | 3/2013 | Davidson et al. | 715/754 |
| 9,092,134 B2 * | 7/2015 | Figura | G06F 3/04886 |
| 2008/0229256 A1 | 9/2008 | Shibaike | |
| 2010/0060597 A1 * | 3/2010 | Choi et al. | 345/173 |
| 2010/0079405 A1 * | 4/2010 | Bernstein | 345/174 |
| 2011/0029185 A1 * | 2/2011 | Aoki et al. | 701/29 |
| 2011/0074698 A1 * | 3/2011 | Rapp et al. | 345/173 |
| 2011/0157042 A1 * | 6/2011 | Li et al. | 345/173 |
| 2011/0164063 A1 * | 7/2011 | Shimotani et al. | 345/661 |
| 2012/0052918 A1 * | 3/2012 | Yang | 455/566 |
| 2012/0079390 A1 * | 3/2012 | Ballagh et al. | 715/738 |

FOREIGN PATENT DOCUMENTS

| | | |
|---|---|---|
| JP | 2011134127 | 7/2011 |
| WO | 0038041 | 6/2000 |

OTHER PUBLICATIONS

European Patent Office, Extended European Search Report issued in connection with European Application No. 12166235.7, dated Jul. 31, 2012, 22 pages.

* cited by examiner

*Primary Examiner* — Kent Chang
*Assistant Examiner* — William Lu
(74) *Attorney, Agent, or Firm* — Fish & Richardson P.C.

(57) ABSTRACT

A method includes, displaying a plurality of selection options on a touch-sensitive display, detecting a touch at a touch location on the touch-sensitive display, determining a touch area based on the touch location, determining an overlap value based on a size of the touch area that overlaps a selection area associated with a selection option, and on a size of the selection area, and identifying a selection option based on the determined overlap value.

18 Claims, 7 Drawing Sheets

METHOD AND APPARATUS FOR DETERMINING A SELECTION OPTION

FIELD OF THE TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified based on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
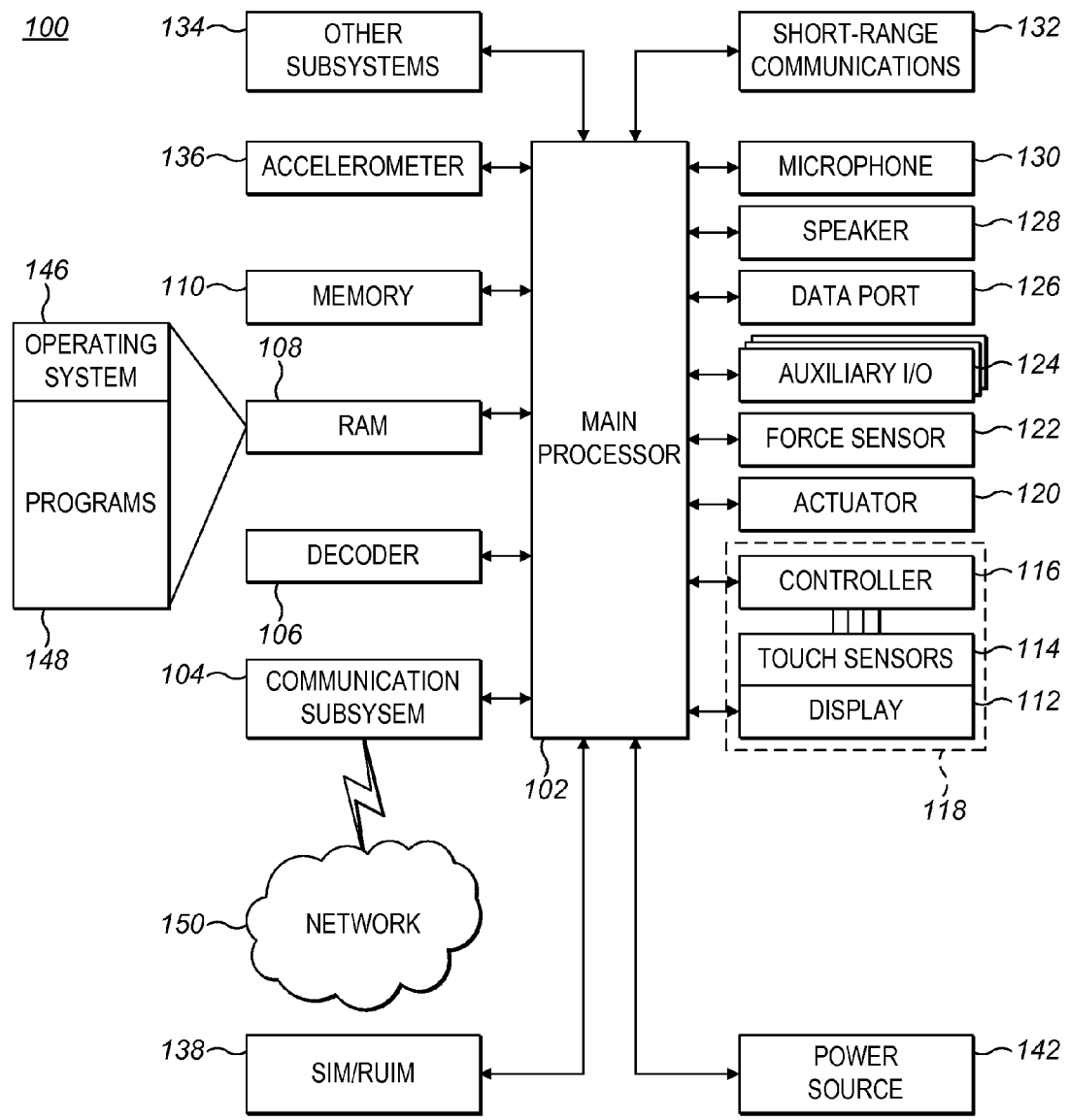
FIG. 1 is a block diagram of a portable electronic device in accordance with the disclosure.

The following describes an apparatus for and method of determining a selection of a selection option based on received input.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110.

Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus (active or passive), pen, or other pointer, based on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
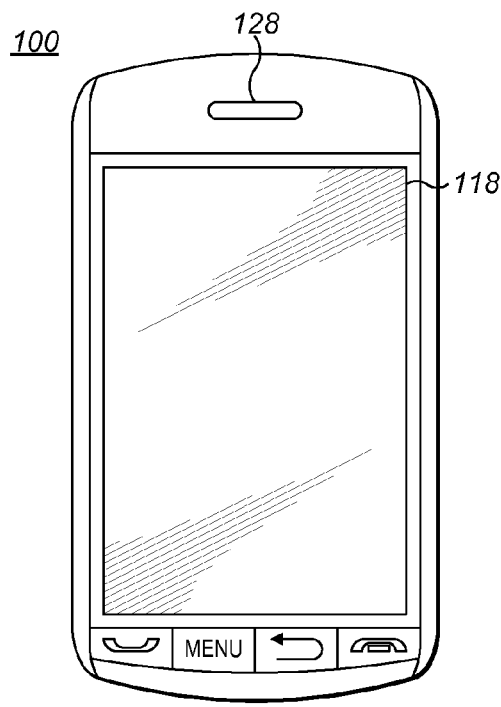
FIG. 2 is a front view of an example of a smartphone in accordance with the disclosure.
Figure 3:
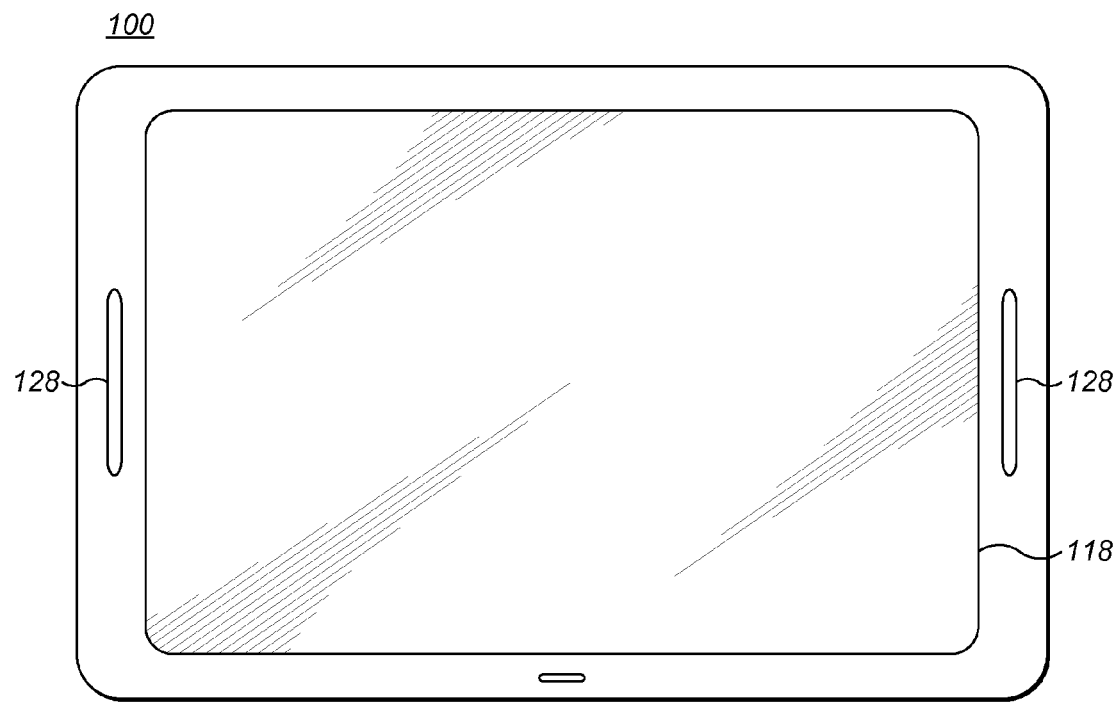
FIG. 3 is a front view of an example of a tablet computer in accordance with the disclosure.

A front view of an example electronic device 100 that is a portable electronic device is illustrated in FIG. 2. A front view of an example electronic device 100 that is a tablet computer 301 is illustrated in FIG. 3.

Selection options may include virtual or displayed elements. When a touch associated with a selection option is detected, the device 100 performs an action associated with the selection option. Examples of selection options include buttons, scrollbars, text input fields, checkboxes, and keys representing characters or functions on a virtual keyboard. Representations of selection options may be displayed on the display 112 of an electronic device 100. Selection options may also include interactive areas that have no visual indication or representation, but may provide input that is detected by the device 100.

A selection area is associated with a selection option. When a touch location is within the selection area for a selection option, the selection option is identified for processing in association with the touch location. When a selection option is displayed on the display 112, the associated selection area may have a different size and shape than the displayed representation of the selection option or the same size and shape may be utilized.

Touch sensors 114 detect touch input, thus providing the device 100 with an interface to identify displayed selection options based on detected touch locations. The resolution of the touch sensors 114 in electronic devices 100 may be an imprecise indication of the actual location of the touch. The touch location has an associated amount of uncertainty, for example 1 to 9 mm based on the spacing of touch sensors 114 and other factors.

Figure 4:
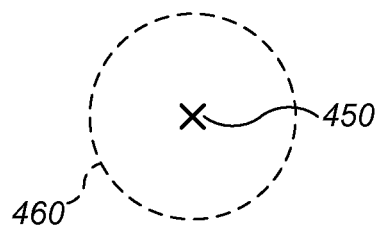
FIG. 4 illustrates an example of a touch area in accordance with the disclosure.

FIG. 4 shows a touch location 450 and a corresponding touch area 460. A touch area 460 may compensate for inherent imprecision of determination of a touch location 450.

The touch area 460 may be derived from touch data received from the touch sensors 114 for a detected touch. A touch area 460 may alternatively be a virtual area around the touch location 450, such as the touch area 460.

The size of the virtual touch area 460 may be based on known characteristics, e.g., uncertainties and inaccuracies, of the touch sensors 114. For example, when the resolution for a touch location 450 is 6 mm, the device 100 may generate a 6 mm radius virtual touch area 460 around a touch location to compensate.

Although a circle is utilized for the touch area 460 in the examples herein, other shapes may be utilized. For example, a custom shape that more accurately represents the contact shape of a finger or stylus touching a touch-sensitive display may be utilized. Other input data may determine the shape or size of the touch area 460. For example, the shape of the touch area 460 may be angled based on orientation information received from the accelerometer 136 because the orientation of the device 100 may affect the angle of contact with the touch-sensitive display 118.

For example, in FIG. 4, a touch location 450 is detected and an associated circular touch area 460 is generated. When the touch location 450 changes to another location, information may be provided as to the angle of the touch input. Adjusting for the angle may reduce uncertainty of touch location perpendicular to direction of change of location of the touch. The touch area may optionally be updated to reflect the direction of change.

Figure 5:
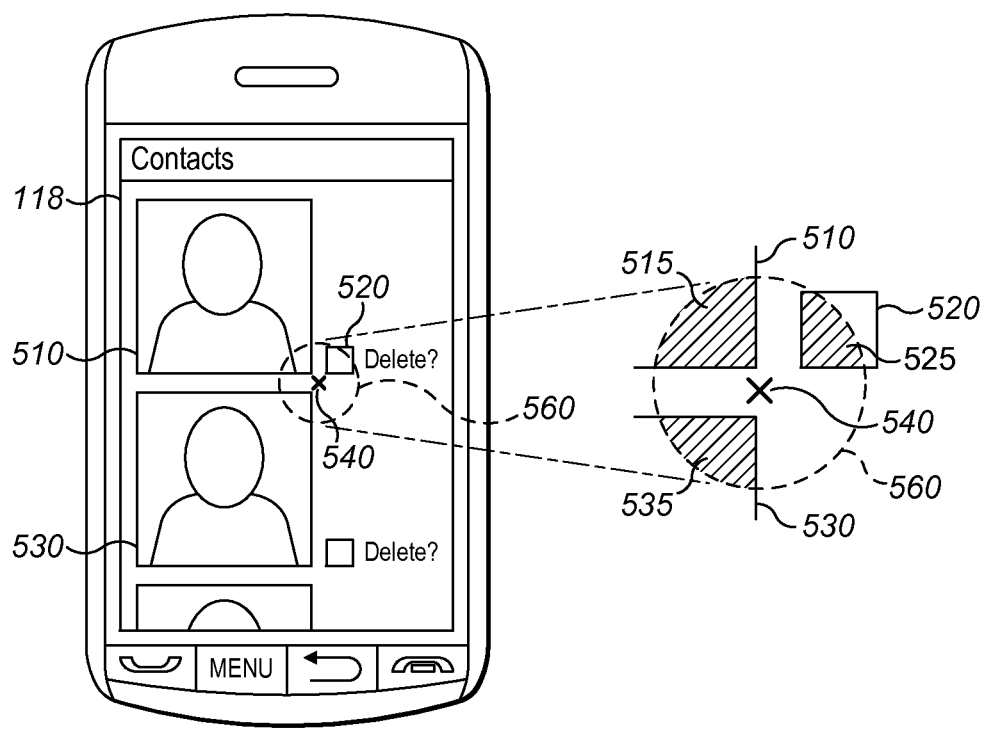
FIG. 5 illustrates an example of overlap values for selection from selection options of different sizes on an electronic device in accordance with the disclosure.

In the example of FIG. 5, a plurality of selection options 510, 520, 530 are displayed on the touch-sensitive display 118. Photos 510, 530 and their associated selection areas are relatively large compared to the selection area and display area of a nearby "Delete?" checkbox 520. The device 100 detects a touch at a touch location 540 near the selection areas 510, 520, 530, but not within any one selection area. In this example, the device 100 generates a virtual touch area 560 to disambiguate between three selection options 510, 520, 530.

As described in greater detail below, an area of overlap between the touch area 560 and the selection areas of the selection options is determined. An overlap value is determined for one or more of the selection areas based on the areas of overlap and optionally the size of the associated selection area. The selection option having the largest overlap value is identified.

In this example, the area of overlap 515 between a first selection area 510 and the touch area 560 is greater than the area of overlap 525 between a selectable checkbox 520 and the touch area 560 and is also greater than the area of overlap 535 between a second selection area 530 and the touch area 560.

The overlap value may be determined by dividing the area of overlap by the size of the selection option, resulting in the proportion of the selection area covered by the touch area 560. The selection area that has the greatest proportion of area overlapping with the touch area 560 is identified as the selection option to input to the device 100. In the example shown in FIG. 5, although the area of overlap 515 with the first selection area 510 is larger than the area of overlap 525 with the area of the selectable checkbox 520, a greater proportion of area 520 is covered by the touch area 560, and the checkbox 520 is identified in this example. Thus, the device 100 need not select the first selection area 510 because the first selection area 510 has the largest area of overlap with the touch area 560.

The overlap values may be utilized to rate the various selection options and provide for selection of a selection option by identifying the selection option having the highest overlap value. In one example, the device determines the overlap value by dividing the area of overlap by the size of the selection area. This determination may be based on additional factors, such as the distance of the touch location to selection options.

Figure 6:
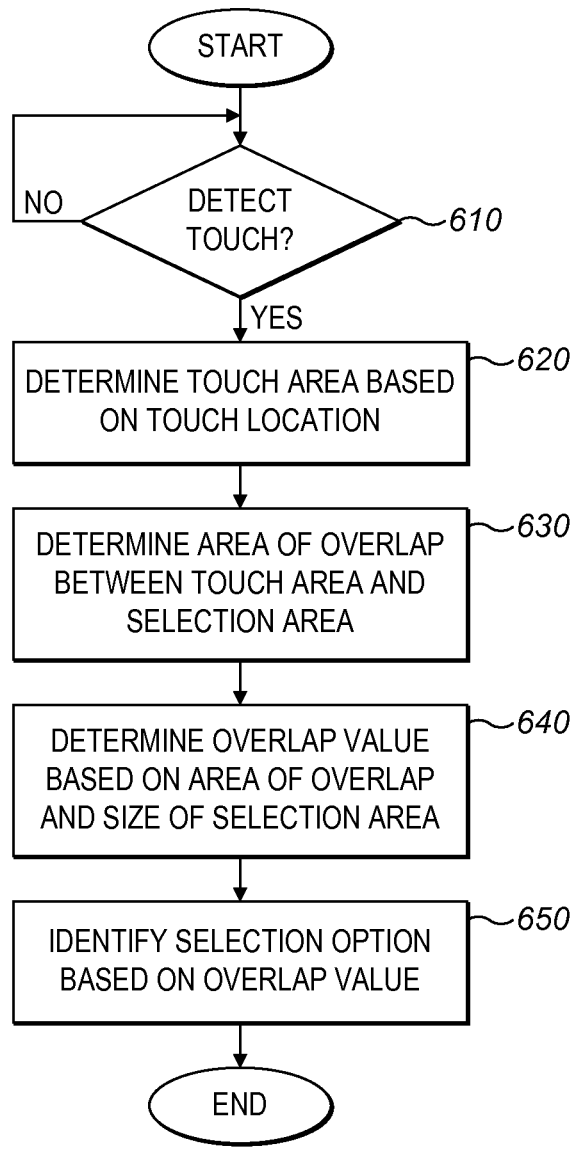
FIG. 6 is a flowchart illustrating a method of selecting a selection option based on overlap values in accordance with the disclosure.

A flowchart illustrating a method of determining overlap values is shown in FIG. 6. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, which may be a non-transitory or tangible storage medium.

When a touch is detected 610 by the touch-sensitive display 118, touch data, including a touch location, is provided to the processor 102. For example, the touch location may be an x, y coordinate and may include additional touch information such as a time stamp. A touch area is determined 620 based on the received touch location. The touch area may be determined based on the raw touch input data or by establishing a virtual touch area based at least on the touch location. The area of overlap between the touch area and the selection area of a selection option is determined 630. The selection area may be the same as or differ from the display area of a selection option.

An overlap value is determined 640 based on the area of overlap and the size of the selection area in this example. This determination may be a division operation of the selection area by the area of overlap. A selection option is selected 650 based on the determined overlap value. This determination may involve comparing the overlap value with overlap values of the other selection options and selecting the overlap value with the largest value. For example, a threshold value for the overlap value may be applied before the corresponding selection option is selected.

Different selection options may be displayed in different virtual layers, which may be referred to as z-orders, and selection options on one layer may overlap or be obscured by selection options in another layer. The obscured areas may be addressed when determining the overlap value. "Obscuring" or "overlapping" of displayed objects refers to virtual obscuring or virtual overlapping herein. A skilled person will understand that the device does not display an obscured area of a selection option.

Figure 7:
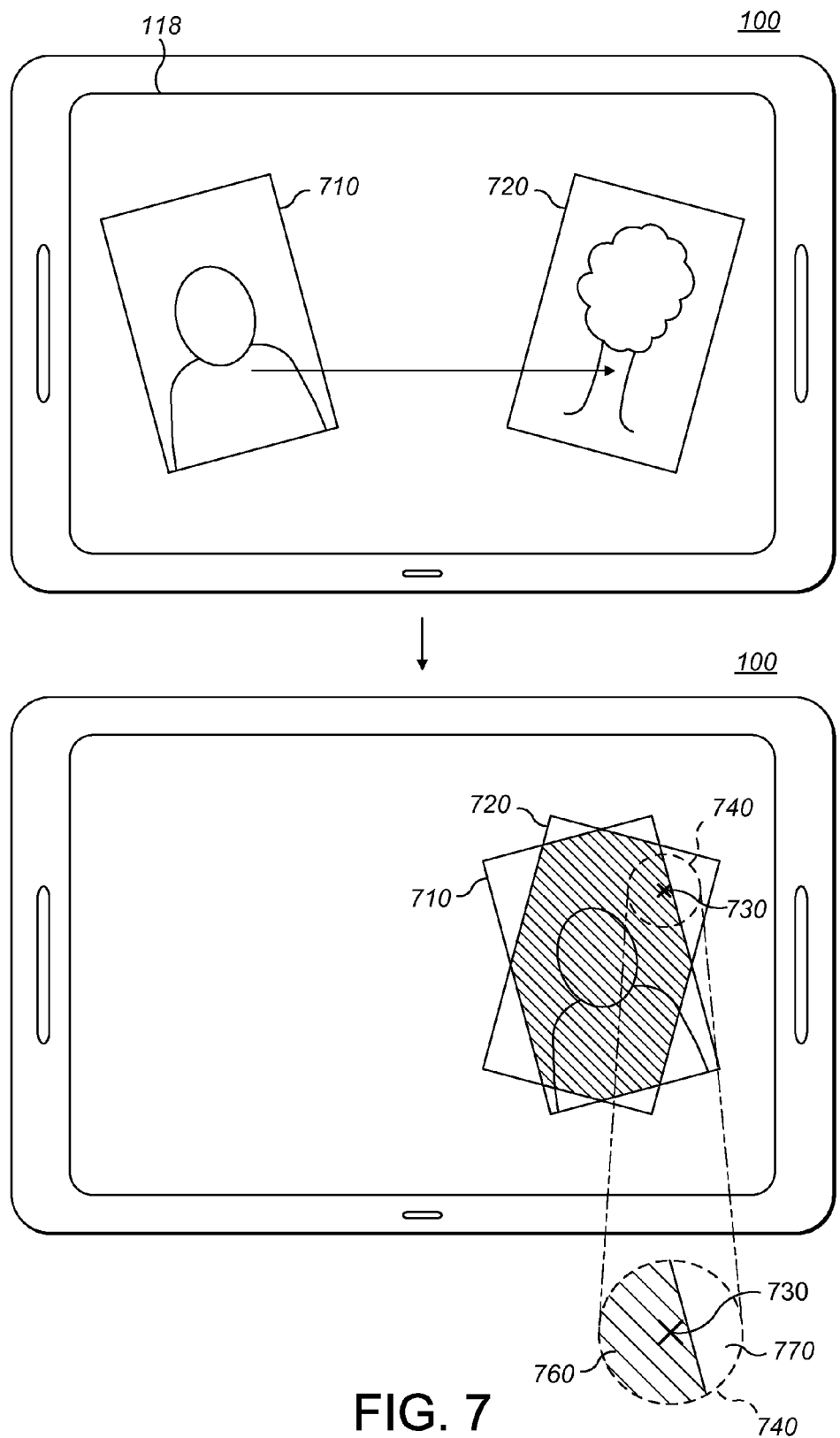
FIG. 7 illustrates an example showing an obscured selection option on an electronic device in accordance with the disclosure.

Two selection options 710, 720 are shown displayed on the touch-sensitive display 118 of the electronic device 100 in FIG. 7. The selection options are shown as photos in a scrapbook application that may be moved around and arranged on the display. In this example, one photo 710 is moved to a position that partially obscures the other photo 720. A user touches the visible region of photo 710 in an attempt to select the upper photo 710. In this example, a virtual touch area 740 is generated for the detected touch location 730 and overlaps with both displayed photos 710, 720.

In this example, when determining an area of overlap with a touch area, the visible areas, not obscured areas, of a selection option are utilized. Any obscured area of a selection option may be excluded when determining of an area of overlap. Selection options may optionally be processed in order, e.g., starting at the top-most or unobscured selection option and proceeding to the bottom-most or lowermost selection option, and determining the areas of overlap between the touch area and each selection area, while excluding regions of a selection option obscured by other selection options.

In another example, areas of overlap with the touch area for selection options on higher layers may be subtracted from an area of overlap with the touch area for a selection option on a lower layer. Any previously determined and optionally stored areas of overlap from higher layers that overlap an area of overlap for a lower layer are subtracted from the determined area of overlap for the lower layer. The resultant area of overlap may be utilized to determine an overlap value by dividing the resultant area of overlap by the selection area.

Figure 8:
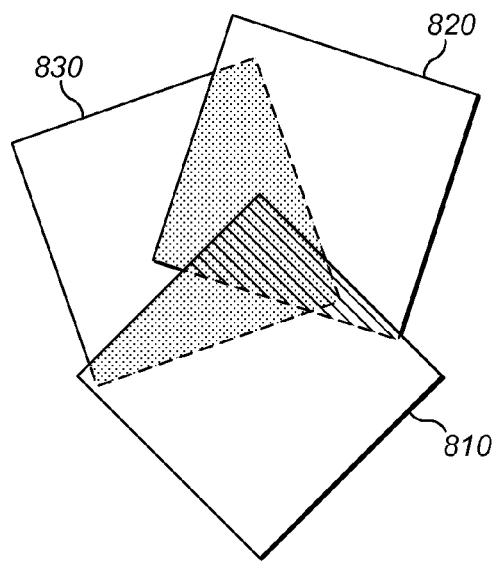
FIG. 8 shows obscured selection options and visible areas in accordance with the disclosure.

FIG. 8 illustrates another example of obscured selection options. In this example, selection option 810 is on top, 820 in the middle layer, and 830 is on the bottom. Selection option 810 partially obscures both selection options 820 and 830, while selection option 820 partially obscures selection option 830. When determining overlap values for each selection option, for example as described with reference to FIG. 7, an area of overlap for selection option 810 may be determined first. An area of overlap with the touch area for selection option 820 is determined and may include subtracting or excluding any area obscured by selection option 810. An area of overlap with the touch area for section option 830 is determined and may include subtracting any area obscured by selection option 810 and selection option 820. Thus, obscured areas that overlap with the touch area are not considered when determining overlap area with the touch area for a selection option.

Figure 9:
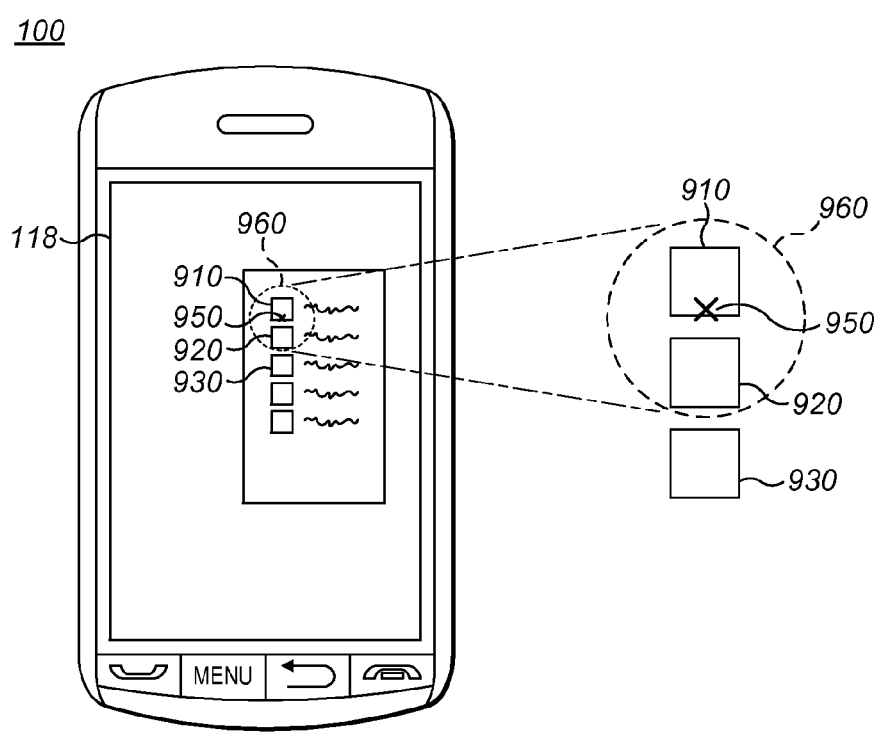
FIG. 9 illustrates an electronic device showing weighting when selecting from multiple selection options in accordance with the disclosure.

In FIG. 9, selection options 910, 920, 930 are displayed in close proximity to one another. When a touch location 950 is detected, the touch area 960 overlaps and entirely covers two of these selection options in this example. When the two selection options 910, 920 are the same size, and the area of overlap is the same, the same overlap value results for both selection options. Mathematical weightings based on factors other than area of overlap and the selection area may be utilized to determine overlap values.

One example of weighting involves considering the touch location, such that when the touch location is associated with a selection option, the overlap value associated with that selection option is increased. In the example of FIG. 9, the touch location 950 is within the area of the upper selection option 910, and the overlap value for that selection option may be increased, giving this selection option 910 a higher overlap value than the lower selection option 920. For example, accurate results may be achieved by multiplying the overlap value of the selection option that contains the touch location 450 by a factor of 2.

Other forms of weighting may be utilized. For example, weightings may be assigned based on the distance of the touch location from the centres of the selection options when input is targeted at the centres, rather than edges or corners of selection options. The smaller the distance, the larger the weighting may be.

Weighting may also be applied to selection options that are more likely to be selected based on context. For example, some buttons or keys may be selected more often than others and may be weighted as more commonly selected buttons. Selection options may be determined to be more commonly selected on a user-by-user basis or by data from all users. One or more selection options may be more likely to be selected as a result of previous actions, for example "EXIT" may be more likely to be selected after a save action is performed, and the "EXIT" selection option may have a higher weighting than other selection options.

Figure 10:
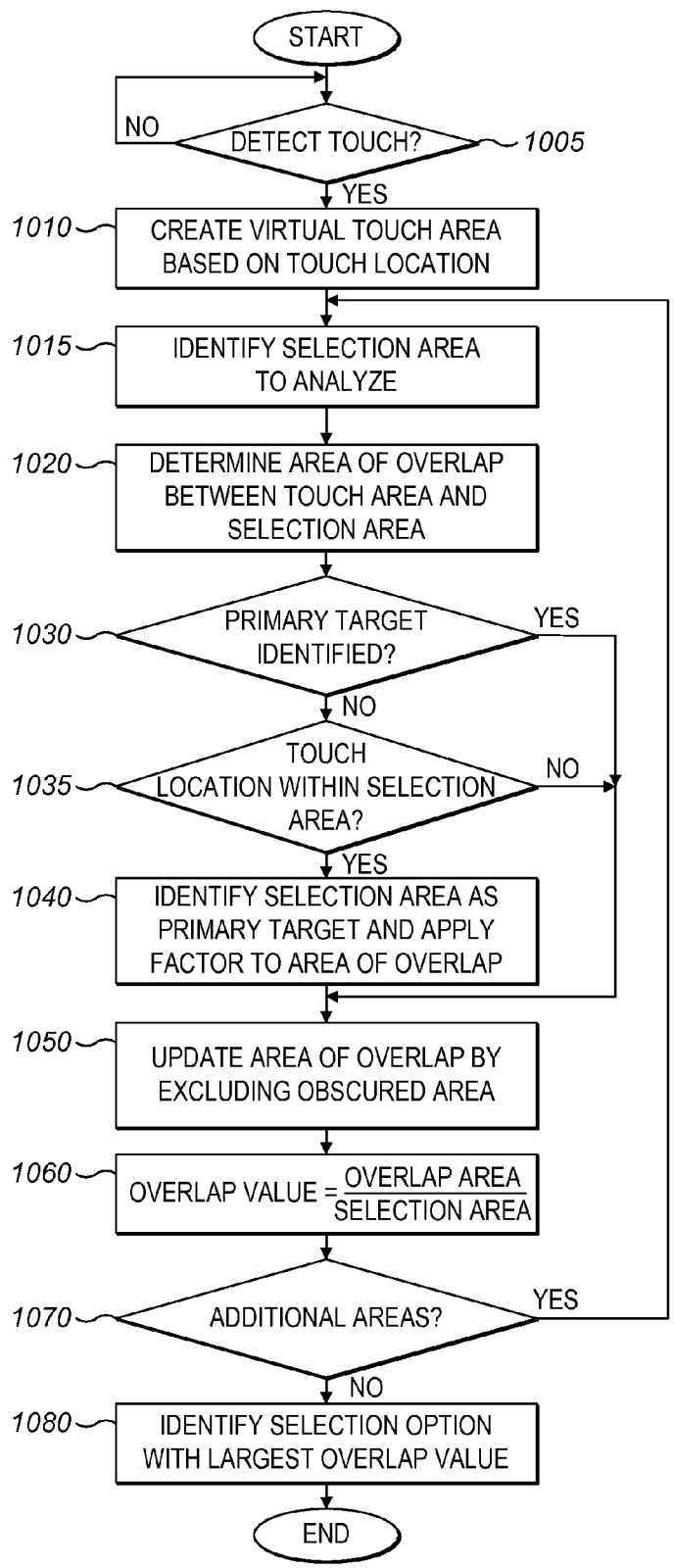
FIG. 10 is a flowchart illustrating a method of selecting a selection option based on overlap values, overlapping selection options, and weighting in accordance with the disclosure.

A flowchart illustrating a method of determining overlap values with weighting is shown in FIG. 10. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, which may be a non-transitory or tangible storage medium.

When a touch is detected 1005 by the touch-sensitive display 118 touch data, including a touch location, is provided to the processor 102. For example, the touch location may be an x, y coordinate and may include additional touch information such as a time stamp. A virtual touch area is established 1010 based on the touch location, for example, by generating a circle of a fixed radius centred on the touch location. The radius may be, for example, 3 mm to 15 mm, 4 mm to 6 mm, 8 mm to 10 mm, or any suitable size or range. A list of selection areas may be accessed and a selection area from the list is identified 1015 to process. For example, each subsequent identification of a selection area at 1015 may be a selection area higher or lower based on ordering or layering of displayed selection options, e.g., in a virtual z-direction. The area of overlap between the touch area and the selection area is determined 1020. When a primary target is identified 1030 or the touch location is not within the selection area at 1035, the process continues at 1050. The weighting is applied 1040 by modifying the area of overlap, for example, by applying a factor to the area of overlap, such as multiplying by 2. The weighting may be applied in other ways, such as adding a factor to the overlap value. The area of overlap is optionally modified 1050 when obscured areas are present. For example, a list of previously determined areas of overlap for selection areas may be stored, and one or more obscured areas may be excluded or subtracted from the area of overlap with the touch area. The updated area of overlap may be added to the list of previously determined areas of overlap. The overlap value is determined by dividing the overlap area by the selection area 1060. The overlap value may be added to a stored list of overlap values. When any additional selection areas are unprocessed 1070, the process continues at 1015. The selection option with the highest overlap value is identified 1080, for example, when all the selection areas with obscured areas are processed.

The implementation described in FIG. 10 is an illustrative example of one of many possible implementations envisioned by this disclosure. Other implementations may choose a different ordering, different weightings, and different combinations. Modifications to the examples may be made utilizing techniques to improve the efficiency and reduce computation or provide other advantages.

The present disclosure may be embodied in other specific forms without departing from its spirit or essential characteristics. The described examples are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
    displaying a plurality of selection options on a touch-sensitive display;
    detecting a touch at a touch location on the touch-sensitive display;
    determining a touch area based on the touch location;
    determining an overlap area based on the touch area that overlaps a selection area associated with a selection option, wherein a first selection area partially obscures a second selection area, further comprising excluding the obscured area of the second selection area when determining the overlap area for the second selection area, wherein said excluding comprises subtracting a portion of the touch area that overlaps the first selection area from a portion of the touch area that overlaps the second area when determining the overlap area of the second selection area;

determining whether the touch location is within the selection area associated with the selection option;

in response to the touch location within the selection area:
assigning a weighting factor associated with the touch location within the selection area; and
determining an overlap value based on a size of the overlap area, a size of the selection area, and the weighting factor;

in response to the touch location outside the selection area, determining the overlap value based on a size of the overlap area and a size of the selection area; and identifying a selection option based on the determined overlap value.

2. The method according to claim 1, wherein the overlap value is determined for each selection area that at least partially overlaps the touch area.

3. The method according to claim 1, wherein the overlap value is determined for each selection area associated with one of the plurality of selection options.

4. The method according to claim 1, wherein the identified selection option has a largest overlap value.

5. The method according to claim 1, wherein the selection areas for the plurality of selection options have different sizes.

6. The method according to claim 1, wherein the touch area is a virtual touch area.

7. The method according to claim 6, wherein the virtual touch area is centered on the touch location.

8. The method according to claim 6, wherein a shape of the virtual touch area is determined by a contact shape of a finger or stylus touching the touch-sensitive display.

9. A non-transitory computer-readable storage medium having computer-readable code executable by at least one processor of a portable electronic device to perform the method of claim 1.

10. An electronic device comprising:
a touch-sensitive display to receive a touch; and
at least one processor coupled to the touch-sensitive display and configured to:
display a plurality of selection options on a touch-sensitive display;
detect a touch at a touch location on the touch-sensitive display;
determine a touch area based on the touch location;
determine an overlap area based on the touch area that overlaps a selection area associated with a selection option, wherein a first selection area partially obscures a second selection area, the processor is further configured to exclude the obscured area of the second selection area when determining the overlap area for the second selection area, wherein said excluding comprises subtracting a portion of the touch area that overlaps the first selection area from a portion of the touch area that overlaps the second area when determining the overlap area of the second selection area;

determine whether the touch location is within the selection area associated with the selection option;

in response to the touch location within the selection area:
assign a weighting factor associated with the touch location within the selection area; and
determine an overlap value based on a size of the overlap area, a size of the selection area, and the weighting factor;

in response to the touch location outside the selection area, determine the overlap value based on a size of the overlap area and a size of the selection area; and identify a selection option based on the determined overlap value.

11. The electronic device according to claim 10, wherein the at least one processor is configured to determine the overlap value for each selection area that at least partially overlaps the touch area.

12. The electronic device according to claim 10, wherein the at least one processor is configured to determine the overlap value for each selection area associated with one of the plurality of selection options.

13. The electronic device according to claim 10, wherein the at least one processor is configured to identify the selection option having a largest overlap value.

14. The electronic device according to claim 10, wherein the at least one processor is configured to display selection options having at least two different sizes.

15. The electronic device according to claim 10, wherein the touch area is a virtual touch area.

16. The electronic device according to claim 15, wherein the virtual touch area is centered on the touch location.

17. The electronic device according to claim 15, wherein a shape of the virtual touch area is determined by a contact shape of a finger or stylus touching the touch-sensitive display.

18. The method according to claim 1, wherein the displayed selection options are processed in order, starting at the first selection option, to determine the overlap value for each selection option.

* * * * *